United States Patent
Lu et al.

(10) Patent No.: US 11,350,787 B2
(45) Date of Patent: Jun. 7, 2022

(54) COOKING APPLIANCE AND METHOD FOR STARCH-BASED FOODSTUFFS

(71) Applicant: KONINKLIJKE PHILIPS N.V., Eindhoven (NL)

(72) Inventors: Weihua Lu, Shanghai (CN); Weimin Xiao, Shanghai (CN); Yafang Jin, Shanghai (CN); Guangming Su, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 153 days.

(21) Appl. No.: 16/648,287

(22) PCT Filed: Sep. 24, 2018

(86) PCT No.: PCT/EP2018/075839
§ 371 (c)(1),
(2) Date: Mar. 18, 2020

(87) PCT Pub. No.: WO2019/057980
PCT Pub. Date: Mar. 28, 2019

(65) Prior Publication Data
US 2020/0260907 A1  Aug. 20, 2020

(30) Foreign Application Priority Data
Sep. 25, 2017 (WO) ................ PCT/CN2017/103146

(51) Int. Cl.
*A47J 36/32* (2006.01)
(52) U.S. Cl.
CPC .................... *A47J 36/321* (2018.08)
(58) Field of Classification Search
CPC ................ A47J 36/321; A47J 36/32
(Continued)

(56) References Cited

U.S. PATENT DOCUMENTS 2,906,620 A * 9/1959 Jung ................. A23B 4/07
426/524
3,261,694 A * 7/1966 Forkner ................. A23B 7/022
426/426
(Continued)

FOREIGN PATENT DOCUMENTS

EP   0440875   8/1991
EP   2930432   10/2015
(Continued)

OTHER PUBLICATIONS

International Search Report and Written Opinion dated Jan. 17, 2019 for International Application No. PCT/EP2018/075839 Filed Sep. 24, 2018.
(Continued)

*Primary Examiner* — Thien S Tran
(74) *Attorney, Agent, or Firm* — Schott, P.C.

(57) ABSTRACT

A device for cooking a starch-based food item is provided in which there is a drying cycle at a temperature below the gelatinization temperature and a cooking cycle at a temperature above the gelatinization temperature. The drying provides a relative weight drop by a first amount and the cooking provides a further relative weight drop. The weight is monitored during drying and cooking to provide feedback control of the duration of the drying and cooking times. The device and method make healthy food with reduced rapid digestible starch (RDS) and increased resistant starch (RS) content. In this way the glycemic index (GI) of a food item is reduced and the resistant starch is increased, which is beneficial to health especially for diabetes and obese groups.

15 Claims, 4 Drawing Sheets

(58) Field of Classification Search
USPC .............................. 99/325; 219/494, 710, 712
See application file for complete search history.

(56) References Cited

U.S. PATENT DOCUMENTS

| | | | | |
|---|---|---|---|---|
| 3,311,991 | A | * | 4/1967 | Rolf .......................... F26B 5/06 |
| | | | | 34/292 |
| 3,615,724 | A | | 10/1971 | Sech |
| 5,441,758 | A | | 8/1995 | Lewis |
| 6,066,838 | A | * | 5/2000 | Koda ...................... H05B 6/688 |
| | | | | 219/703 |
| 2010/0251903 | A1 | | 10/2010 | Maguire |
| 2011/0151076 | A1 | | 6/2011 | Zapp |
| 2014/0023774 | A1 | | 1/2014 | Huber |
| 2017/0071393 | A1 | | 3/2017 | Li |

FOREIGN PATENT DOCUMENTS

| WO | 93/25092 | 12/1993 |
|---|---|---|
| WO | 2015/135788 | 9/2015 |
| WO | 2015/185404 | 12/2015 |

OTHER PUBLICATIONS

Allen et al: "Glycemic Index of Sweet Potato as Affected by Cooking Methods", The Open Nutrition Journal, 2012, 6, 1-11.

* cited by examiner

COOKING APPLIANCE AND METHOD FOR STARCH-BASED FOODSTUFFS

CROSS REFERENCE TO RELATED APPLICATIONS

This application is the U.S. National Phase application under 35 U.S.C. § 371 of International Application No. PCT/EP2018/075839 filed Sep. 24, 2018, published as WO 2019/057980 on Mar. 28, 2019, which claims the benefit of Patent Application Number PCT/CN2017/103146 filed Sep. 25, 2017. These applications are hereby incorporated by reference herein.

FIELD OF THE INVENTION

This invention relates to the cooking of starch-based foodstuffs, in particular potatoes.

BACKGROUND OF THE INVENTION

Nutrients are chemicals found in foods that are critical to human growth and function. There are six groups of essential nutrients: carbohydrates, lipids, proteins, vitamins, minerals and water. Carbohydrates together with lipids and proteins provide energy for the body, particularly for the brain and for physical exercise.

Starch food including rice, wheat, and potato is a staple food for almost all the world and is the main source of carbohydrates. Our bodies easily digest most cooked starches, in which alpha bonds link the numerous glucose units together. Starch food, like rice, bread, pasta and potato are thus important for health and generally eaten daily as a primary food source.

One of the concerns associated with the consumption of starch-based food is the high glycemic property and its relationship to diabetes. In particular, potato is regarded as "the second bread" for human consumption due to its high nutrition value, containing vitamin A, vitamin C, minerals and high quality starch.

Potatoes are often broadly classified as high on the glycemic index (GI) scale and so are often excluded from the diets of individuals trying to follow a low-GI diet. The GI of potatoes can vary considerably depending on the type, origin and cooking methods. Chips in particular have both high fat and high GI (for example greater than 70).

Starch can be classified into rapidly digestible starch (RDS), slowly digestible starch (SDS), and resistant starch (RS). The cause of the high GI is in particular the rapidly digestible starch (RDS). A reduction in RDS and an increase in SDS and/or RS are thus conducive to lowering GI value. For a balanced healthy diet, a reduced intake of digestible food is desired to avoid over-intake of energy and reduce the risk of obesity or diabetes. Like dietary fiber, the resistant starch ("RS") is not digested. It is widely recognized that modern diets do not provide enough dietary fiber, which is an important component for gastrointestinal health. Reports have indicated that the average intake (13-15 g per day) is much lower than the recommended value (25 g and 38 g per day for women and men, respectively).

Cooking starch-based food normally makes the starch fully gelatinized which can be quickly digested and absorbed. This then increases the blood glucose level and insulin response after consumption. The quick increase of blood glucose may promote metabolic diseases such as obesity and diabetes.

In the food industry, complex physical and chemical procedures are used to generate resistant starch which require professional processing methods such as high pressure and long processing time. Some methods also involve using various harmful chemical reagents and elements. Pre-treatment methods are known for reducing oil content of French fries, such as soaking with salt solution before frying, or adopting new cooking methods like air frying.

US 2014/0023774 discloses a method for providing enhanced resistant starch based on a low temperature treatment before cooking. A reduction in water content is discussed, for example to below 35%, but it is not clear how water content measurement may be implemented, particularly in a domestic cooking appliance. To reach a water content below the suggested 35% using a low temperature treatment phase would also take a substantial length of time.

There remains a need for a method to reduce the rapidly digestible starch, RDS, and/or increase the dietary fiber (i.e. resistant starch, RS) component of starch food during cooking for normal consumers and using home kitchen appliances.

SUMMARY OF THE INVENTION

The invention is defined by the claims.

According to examples in accordance with an aspect of the invention, there is provided a device for cooking a starch-based food item, comprising:
a vessel for receiving a quantity of the starch-based food item;
a weighing scale for weighting the food item during cooking;
a heater for heating the vessel contents; and
a controller,
wherein the controller is adapted to implement a cooking cycle which comprises:
  performing drying using the heater at a temperature below 58 degrees Celsius for a time duration sufficient for the food item weight to drop from an initial weight by a first amount relative to the initial weight in a first range as determined based on weighing during drying; and
  performing cooking using the heater at a temperature above 60 degrees Celsius for a time duration sufficient for the food item weight to drop by a further amount such that the total drop relative to the initial weight is in a second range as determined based on weighing during cooking.

This cooking process enables a reduction in rapidly digestible starch, RDS, and an increase in resistance starch, RS, compared to a conventional cooking process. The device makes use of measurement of the weight of the food during drying and cooking to control the drying and cooking times and thus enables a fully automated cooking process to be carried out by the device. It is thus suitable for implementation as a (low cost) kitchen appliance. The drying is carried out at a temperature below the gelatinization temperature, whereas the cooking is carried out at a temperature above the gelatinization temperature.

The weight reduction corresponds to a reduction in water content, so the process basically controls the water content in both a drying phase and a cooking phase.

The first amount is for example in the weight loss range 10% to 40% and total weight loss amount is in the range 35-65%. In combination, these ranges provide a desired overall water content reduction corresponding to a desired property of the cooked food item.

The controller may comprise an input for receiving an indication that the food item is fresh potatoes or frozen potatoes. In this way, different cooking cycles may be provided for fresh or frozen potatoes. In particular, the original water content differs between fresh potato (e.g. 80%) and frozen (partially cooked commercial) potato (e.g. 70%) so that different cooking cycles are needed to reach a desired final water content, which may be around 50%.

The identification may come from the user by providing user input, or the device may comprise a sensor for sensing e.g. the temperature of the food item and reporting to the controller. The controller may comprise other inputs, for example an input for receiving an indication of a desired doneness or stickiness, and a desired cooking temperature.

If the food item is indicated as fresh potatoes, the first amount may be in the range 10% to 40% and the second amount is in the range 55% to 65%.

If the food item is indicated as frozen potatoes, the first amount may be in the range 10% to 30% and the second amount is in the range 35% to 45%.

The different weight control approaches reflect the different original water content of the potatoes.

The drying temperature may be in the range 40 to 58 degrees Celsius and the cooking temperature may be in the range 140 to 220 degrees Celsius.

The device may comprise an air fryer. This is a device which cooks by circulating hot air in the cooking chamber, and it enables a low fat cooking process. Thus, the fat content as well as rapidly digestible starch content can be reduced compared to conventional frying approaches, to provide a more healthy cooking process particularly for potatoes.

The water content of the food item after cooking is for example in the range 40% to 60%, for example around 50% as mentioned above.

The invention also provides a method for cooking a starch-based food item, comprising:

using a heater to performing drying at a temperature below 58 degrees Celsius;

monitoring the weight during drying and drying for a time duration sufficient for the food item weight to drop from an initial weight by a first amount relative to the initial weight in a first range; and using the heater to performing cooking at a temperature above 60 degrees Celsius; monitoring the weight during cooking and cooking for a time duration sufficient for the food item weight to drop by a further amount such that the total drop relative to the initial weight is in a second range.

The first amount is for example in the range 10% to 40% and the total drop is in the range 35 to 65%. These provide the required drying and cooking phases for a reduced rapidly digestible starch (RDS) content.

The method may comprise receiving an indication that the food item is fresh potatoes or frozen potatoes, wherein the method comprises:

if the food item is indicated as fresh potatoes, setting the first amount in the range 10% to 40% and the total drop in the range 55% to 65%; and if the food item is indicated as frozen potatoes, setting the first amount in the range 10% to 30% and the total drop in the range 35% to 45%.

The drying is for example carried out at a temperature in the range 40 to 58 degrees Celsius and the cooking is for example carried out in the range 140 to 220 degrees Celsius.

The method may be implemented at least in part in software.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a device for cooking a starch-based food item in which there is a drying cycle at a temperature below the gelatinization temperature and a cooking cycle at a temperature above the gelatinization temperature. The drying provides a relative weight drop by a first amount and the cooking provides a further relative weight drop. The weight is monitored during drying and cooking to provide feedback control of the duration of the drying and cooking times. The device and method make healthy food with reduced rapid digestible starch (RDS) and increased resistant starch (RS) content. In this way the glycemic index (GI) of a food item is reduced and the resistant starch is increased, which is beneficial to health especially for diabetes and obese groups.

Figure 1:
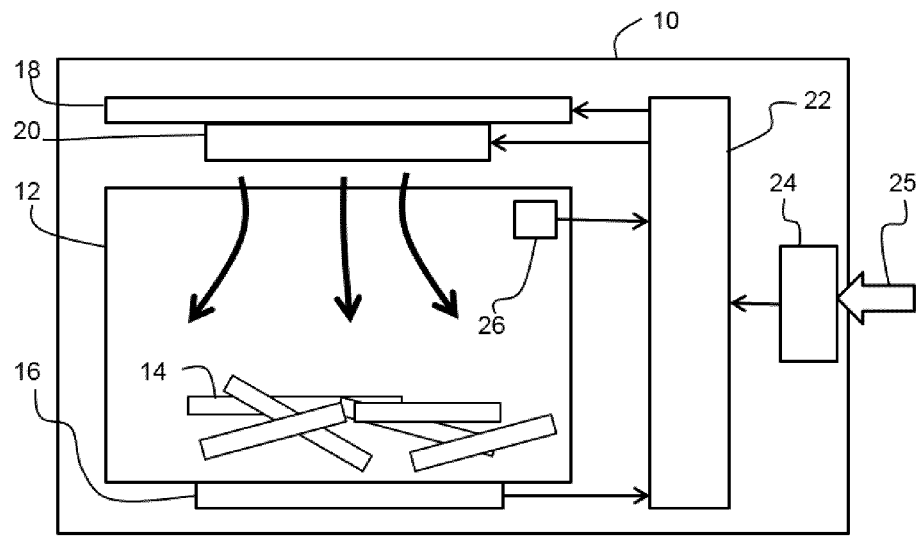
FIG. 1 shows a cooking device.

FIG. 1 shows the cooking device 10. It comprises a vessel 12 for receiving a quantity of a starch-based food item, in particular potatoes 14.

A weighing scale 16 is provided for weighting the potatoes during cooking and a heater 18 is used for heating the vessel contents. In a preferred example, the device is an air fryer and has a fan 20 for circulating hot air around the vessel 12.

The weighting scale provides its output to a controller 22, which controls the temperature and timing of operation of the heater 18. A user interface unit 24 receives user input 25 for controlling the cooking process and setting user preferences, which may include temperatures, time delays and any other conventional cooker control parameters. A temperature sensor 26 enables temperature regulation by the controller 22.

The controller 22 implements a cooking cycle which comprises a drying phase at a temperature below 58 degrees Celsius (hence below the gelatinization temperature) and a higher temperature cooking cycle, above the gelatinization temperature and typically significantly higher such as 140 degrees Celsius or higher.

This cooking process enables a reduction in rapidly digestible starch, RDS, and an increase in resistant starch, RS, compared to a conventional cooking process. The invention provides temperature control and water content control (based on weight measurement) at different cooking stages, and it is of particular interest for making homemade potato chips in an air fryer type of cooker as shown.

The drying process for example provides a 30% weight loss for example at a temperature of 50° C. For fresh potatoes, the weight loss is more generally preferably in the range 10% to 40%. The average water content of a fresh potato is around 80% so a relative weight loss in the range 10% to 40% results in a water content in the range 78% ((80−10)/(100−10)=70/90) to 67% (40/60). For commercial frozen French fries, the initial water content is lower, typically around 70%. The range of weight loss is then more preferably in the range 10% to 30%, so that the resulting water content is in the range 67% (60/90) to 57% (40/70).

The cooking process is at a higher temperature such as 180V and more general typically in the range 140 to 220° C.

For fresh potatoes, the further weight loss results in a total loss compared to the original sample of for example 60%. The resulting water content is then 50% ((80−60)/(100−60)= 20/40). More generally, the total loss is in the range 55% to 65%.

For frozen potatoes such as French fires the further weight loss results in a total weight loss compared to the original sample of for example 40%. The resulting water content is again 50% ((70−40)/(100−40)=(30/60). More generally, the total loss is in the range 35% to 45%.

Thus, it can be seen that although the drying and cooking times are controlled based on weight feedback, the aim is to provide an end product with a particular water content, which correlates to a particular level of cooking. The water content of the potatoes after cooking is for example in the range 40% to 60%, for example around 50% as mentioned above. This applies to both fresh potatoes and frozen potatoes.

By way of example, for 200 g fresh French fries, it may take 19 minutes at 50 degrees Celsius to reach a 30% weight loss, then another 8.5 minutes (180° C.) to reach a total 60% weight loss.

In general, the drying process for example lasts between 10 and 30 minutes, for example between 15 and 25 minutes, and the subsequent cooking process lasts between 5 minutes and 20 minutes.

As is clear from the description above, a different process is followed for frozen potatoes than for fresh potatoes. For this purpose, the controller needs to know what type of potatoes are being cooked, The user can simply input this information by making a cooking mode selection. The controller then sets the cooking parameters, which may additionally and automatically take account of the weight of potatoes being cooked. Thus, the controller comprises an input for receiving an indication that the food item is fresh potatoes or frozen potatoes.

The indication may instead be provided automatically by providing a sensor for sensing the temperature of the food item or another parameter such as the hardness. In one example, the weight loss rate during the initial drying process may be used as an indicator to distinguish between fresh and frozen: For fresh potato, the weight loss is for example around 3% in the first 3 minutes while the weight loss is only around 0.65% in the first 3 minutes for commercial frozen fries. Thus, the beginning of the drying phase may be analyzed in order to determine the parameters for the remainder of the drying and cooking process.

The benefits of the cooking process have been demonstrated by experiment.

In a first experiment French fries were made from fresh potatoes. The potatoes after cutting into chips were soaked in water for 30 minutes and drained and surface dried. After cooking the potatoes were analyzed using laboratory equipment.

Figure 2:
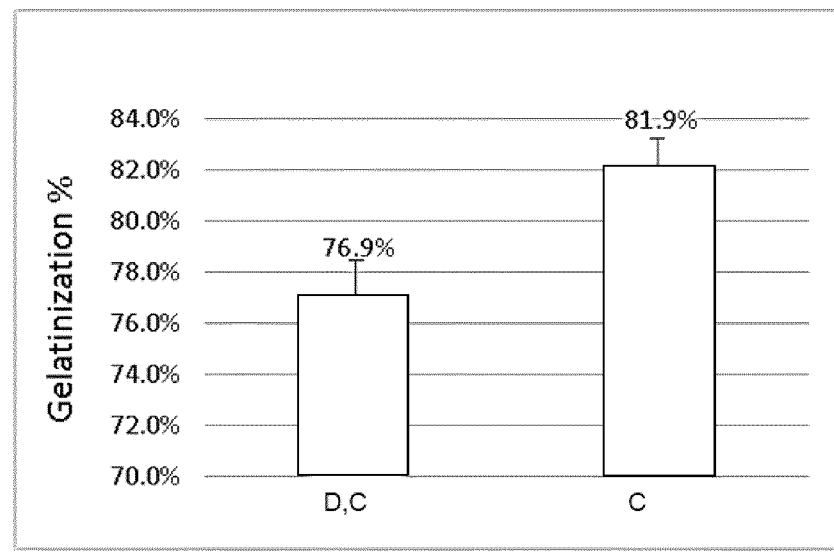
FIG. 2 shows a measured proportion of gelatinization for the process implemented by the device of FIG. 1.

FIG. 2 shows the measured proportion of gelatinization for the process described above, of drying and cooking "D,C" compared to the standard cooking-only process "C".

Figure 3:
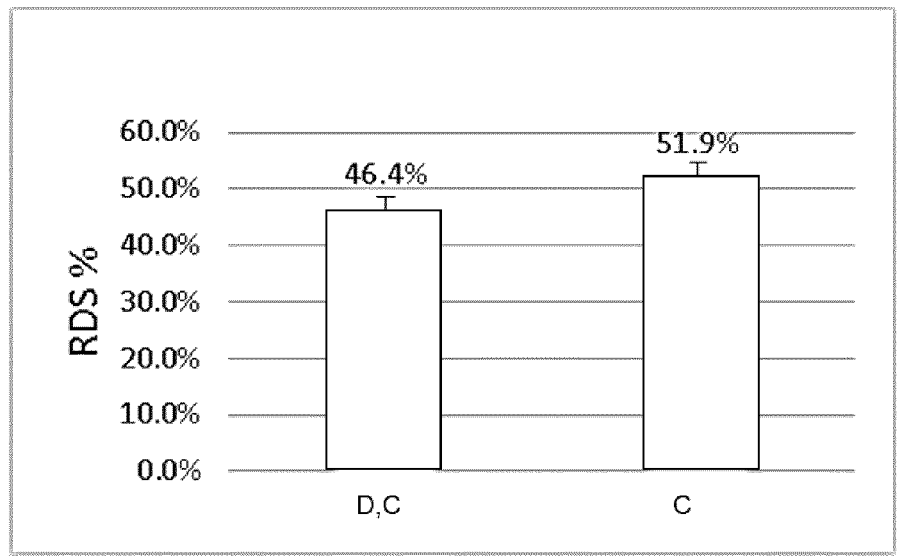
FIG. 3 shows a measured proportion of rapidly digestible starch for the process implemented by the device of FIG. 1 as well as for a conventional cooking process when using fresh potatoes.
Figure 4:
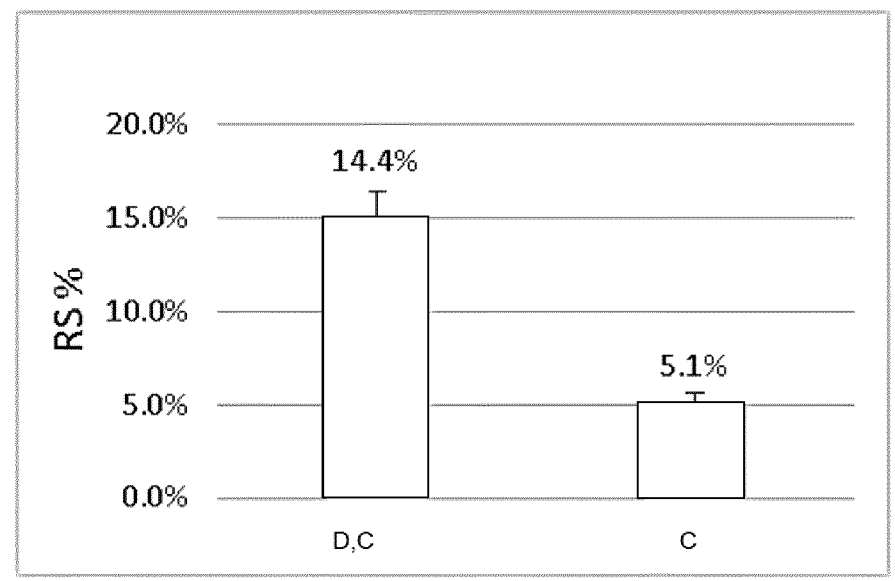
FIG. 4 shows a measured proportion of resistant starch for the process implemented by the device of FIG. 1 as well as for a conventional cooking process when using fresh potatoes.

FIG. 3 shows the measured proportion of rapidly digestible starch for the two cooking processes, and FIG. 4 shows the measured proportion of resistant starch for the two cooking processes.

The standard cooking cycle involved cooking 200 g of the potato chips until a 60% weight loss was achieved at 180V in the air fryer. The modified process involved drying and cooking 200 g of potato chips, with drying until a 30% weight loss was achieved at 50° C. in the air fryer, followed by cooking until the same total 60% weight loss was reached at 180° C.

After cooking, the samples were stored at room temperature for 15 minutes before starch composition analysis. It is noted that sensory characteristics of the potato chips from the two different cooking processes were similar.

FIGS. 2 to 4 show the reduced gelatinization, reduced RDS content and increased RS content compared to the standard process.

In a second experiment French fries were made from frozen prepared chips. For the conventional process, 200 g of French fries were cooked until 40% weight loss at 180° C. in the air fryer. For the new process, 200 g of French fries were dried until 20% weight loss at 50° C. in the air fryer, then cooked until a total 40% weight loss at 180° C. After cooking, the samples were again stored at room temperature for 15 minutes before starch composition analysis.

Figure 5:
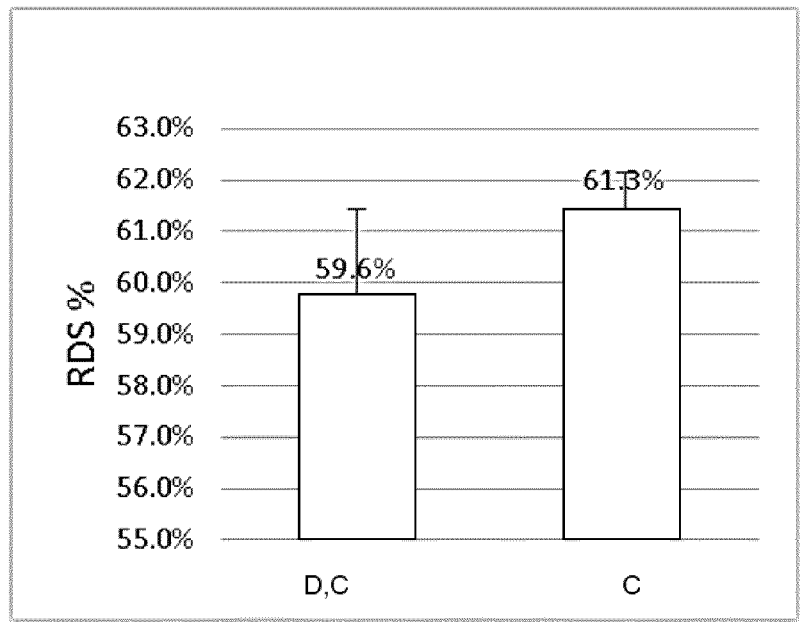
FIG. 5 shows a measured proportion of rapidly digestible starch for the process implemented by the device of FIG. 1 as well as for a conventional cooking process when using frozen potatoes.
Figure 6:
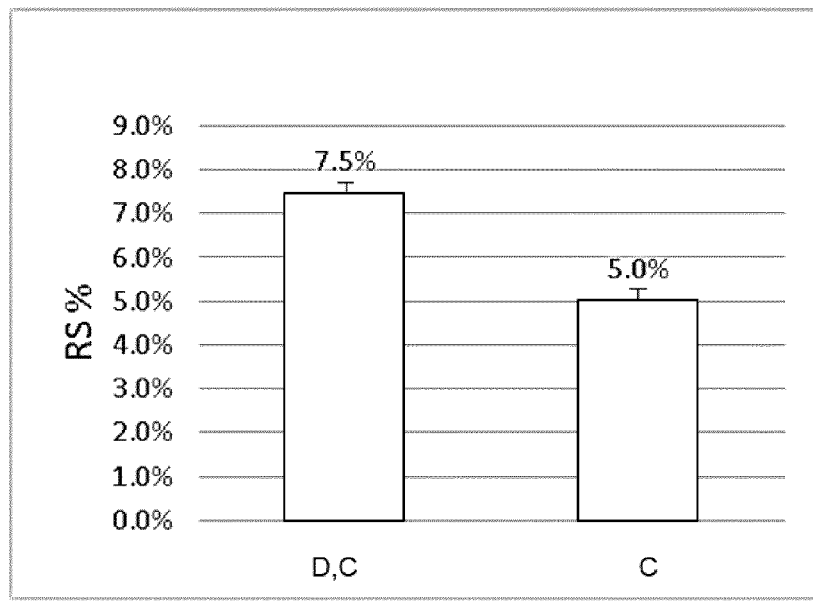
FIG. 6 shows a measured proportion of resistant starch for the process implemented by the device of FIG. 1 as well as for a conventional cooking process when using frozen potatoes.

FIG. 5 shows the measured proportion of rapidly digestible starch for the two cooking processes, and FIG. 6 shows the measured proportion of resistant starch for the two cooking processes. Again, the RDS content decreases and the RS content increases. Thus GI value of the chips with new cooking process is lower.

Figure 7:
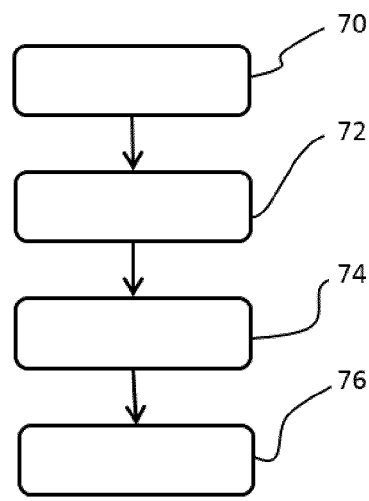
FIG. 7 shows a method for cooking a starch-based food item.

FIG. 7 shows a method for cooking a starch-based food item, comprising:

in step 70, using a heater to perform drying at a temperature below 55 degrees Celsius;

in step 72, monitoring the weight during drying and drying for a time duration sufficient for the food item weight to drop from an initial weight by a first amount relative to the initial weight in a first range;

in step 74, using the heater to performing cooking at a temperature above 60 degrees Celsius; and in step 76, monitoring the weight during cooking and cooking for a time duration sufficient for the food item weight to drop by a further amount such that the total drop is in a second range.

The system described above makes use of a controller or processor for processing data.

Figure 8:
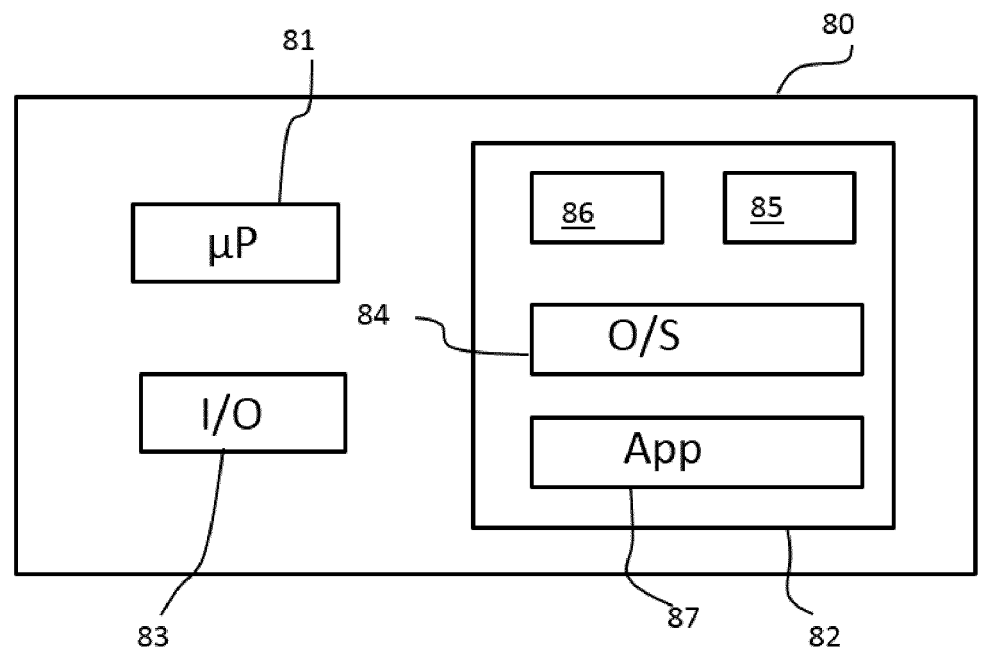
FIG. 8 illustrates an example of a computer for implementing the controller or processor used in the device.

FIG. 8 illustrates an example of a computer 80 for implementing the controller or processor described above.

The computer 80 includes, but is not limited to, PCs, workstations, laptops, PDAs, palm devices, servers, storages, and the like. Generally, in terms of hardware architecture, the computer 80 may include one or more processors 81, memory 82, and one or more I/O devices 83 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 81 is a hardware device for executing software that can be stored in the memory 82. The processor 81 can be virtually any custom made or commercially available processor, a central processing unit (CPU), a digital signal processor (DSP), or an auxiliary processor among several processors associated with the computer 80, and the processor 81 may be a semiconductor based microprocessor (in the form of a microchip) or a microprocessor.

The memory 82 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 82 may incorporate electronic, magnetic, optical, and/or other types of storage media. Note that the memory 82 can have a distributed architecture, where various components are situated remote from one another, but can be accessed by the processor 81.

The software in the memory 82 may include one or more separate programs, each of which comprises an ordered listing of executable instructions for implementing logical functions. The software in the memory 82 includes a suitable operating system (O/S) 84, compiler 85, source code 86, and one or more applications 87 in accordance with exemplary embodiments.

The application 87 comprises numerous functional components such as computational units, logic, functional units, processes, operations, virtual entities, and/or modules.

The operating system 84 controls the execution of computer programs, and provides scheduling, input-output control, file and data management, memory management, and communication control and related services.

Application 87 may be a source program, executable program (object code), script, or any other entity comprising a set of instructions to be performed. When a source program, then the program is usually translated via a compiler (such as the compiler 85), assembler, interpreter, or the like, which may or may not be included within the memory 82, so as to operate properly in connection with the operating system 84. Furthermore, the application 87 can be written as an object oriented programming language, which has classes of data and methods, or a procedure programming language, which has routines, subroutines, and/or functions, for example but not limited to, C, C++,C #, Pascal, BASIC, API calls, HTML, XHTML, XML, ASP scripts, JavaScript, FORTRAN, COBOL, Perl, Java, ADA, NET, and the like.

The I/O devices 83 may include input devices such as, for example but not limited to, a mouse, keyboard, scanner, microphone, camera, etc. Furthermore, the I/O devices 83 may also include output devices, for example but not limited to a printer, display, etc. Finally, the I/O devices 83 may further include devices that communicate both inputs and outputs, for instance but not limited to, a network interface controller (MC) or modulator/demodulator (for accessing remote devices, other files, devices, systems, or a network), a radio frequency (RF) or other transceiver, a telephonic interface, a bridge, a router, etc. The I/O devices 83 also include components for communicating over various networks, such as the Internet or intranet.

When the computer 80 is in operation, the processor 81 is configured to execute software stored within the memory 82, to communicate data to and from the memory 82, and to generally control operations of the computer 80 pursuant to the software. The application 87 and the operating system 84 are read, in whole or in part, by the processor 81, perhaps buffered within the processor 81, and then executed.

When the application 87 is implemented in software it should be noted that the application 87 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The invention is of primary interest for cooking potatoes. Of course the cooking process may just be one cooking mode of an air fryer. Another cooking mode may be the conventional single-stage heating process. However the single stage heating process may again be controlled using weight feedback (again with the aim of reaching a specific water content) rather than simply having a fixed duration. Fixed time duration cooking processes may also be provided.

The device may have many different (and conventional) modes for different food items. The two stage invention is not limited to potatoes, and may be applied to other starch based food items such as sweet potato, taro and cassava.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device for cooking a starch-based food item, comprising:
   a vessel for receiving a quantity of the starch-based food item;
   a weighing scale for weighing the starch-based food item during cooking;
   a heater for heating contents in the vessel; and
   a controller,
   wherein the controller is adapted to implement a cooking cycle which comprises:
      performing drying using the heater at a drying temperature below 58 degrees Celsius for a time duration sufficient for the starch-based food item weight to drop from an initial weight by a first amount relative to the initial weight in a first range as determined based on weighing during drying; and
      performing cooking using the heater at a cooking temperature above 60 degrees Celsius for a time duration sufficient for the starch-based food item weight to drop by a further amount such that a total drop relative to the initial weight is in a second range as determined based on weighing during cooking.

2. The device as claimed in claim 1, wherein the first amount is in a range of 10% to 40%.

3. The device as claimed in claim 1, wherein the total drop is in a range of 35% to 65%.

4. The device as claimed in claim 1, wherein the controller comprises an input for receiving an indication that the starch-based food item is fresh potatoes or frozen potatoes.

5. The device as claimed in claim 4, wherein if the starch-based food item is indicated as fresh potatoes, the first amount is in a range of 10% to 40% and the total drop is in a range of 55% to 65%.

6. The device as claimed in claim 4, wherein if the starch-based food item is indicated as frozen potatoes, the first amount is in a range of 10% to 30% and the total drop is in a range of 35% to 45%.

7. The device as claimed in claim 1 wherein the drying temperature is in a range of 40 to 58 degrees Celsius and the cooking temperature is in a range of 140 to 220 degrees Celsius.

8. The device as claimed in claim 1, further comprising an air fryer.

9. The device as claimed in claim 1, wherein a water content of the starch-based food item after cooking is in a range of 40% to 60%.

10. A method for cooking a starch-based food item, comprising:
   using a heater for performing drying at a temperature below 58 degrees Celsius;
   monitoring a weight of the starch-based food item during drying and drying for a time duration sufficient for the starch-based food item weight to drop from an initial weight by a first amount relative to the initial weight in a first range;
   using the heater for performing cooking at a temperature above 60 degrees Celsius; and
   monitoring the weight during cooking and cooking for a time duration sufficient for the starch-based food item weight to drop by a further amount such that a total drop relative to the initial weight is in a second range.

11. The method as claimed in claim 10, wherein the first amount is in a range of 10% to 40% and the total drop is in a range of 35 to 65%.

12. The method as claimed in claim 10, further comprising receiving an indication that the starch-based food item is fresh potatoes or frozen potatoes, wherein the method further comprises:
   if the starch-based food item is indicated as fresh potatoes, setting the first amount in a range of 10% to 40% and the total drop in a range of 55% to 65%; and
   if the starch-based food item is indicated as frozen potatoes, setting the first amount in a range of 10% to 30% and the total drop in a range of 35% to 45%.

13. The method as claimed in claim 10, wherein drying is carried out at a temperature in a range of 40 to 58 degrees Celsius and cooking is carried out at a temperature in a range of 140 to 220 degrees Celsius.

14. The method as claimed in claim 10, wherein the method is implemented in an air fryer.

15. A non-transitory computer readable recording medium storing a computer program comprising computer program code means adapted, when said computer program is run on a computer, to implement the method of claim 10.

* * * * *